F. R. S. DITMARS.
STAMP AFFIXING AND ENVELOP SEALING MACHINE.
APPLICATION FILED MAR. 1, 1909.

1,001,001.

Patented Aug. 22, 1911.

5 SHEETS—SHEET 1.

Witnesses.
C. L. Bronson

Inventor
Frederick R. S. Ditmars
By Manning
Attorney

F. R. S. DITMARS.
STAMP AFFIXING AND ENVELOP SEALING MACHINE.
APPLICATION FILED MAR. 1, 1909.

1,001,001.

Patented Aug. 22, 1911.
5 SHEETS—SHEET 2.

Witnesses.
C. L. Brown
S. L. C. Hasson

Inventor
Frederick R. S. Ditmars
By Dick & Manning
Attorneys

F. R. S. DITMARS.
STAMP AFFIXING AND ENVELOP SEALING MACHINE.
APPLICATION FILED MAR. 1, 1909.
1,001,001.
Patented Aug. 22, 1911.
5 SHEETS—SHEET 3.
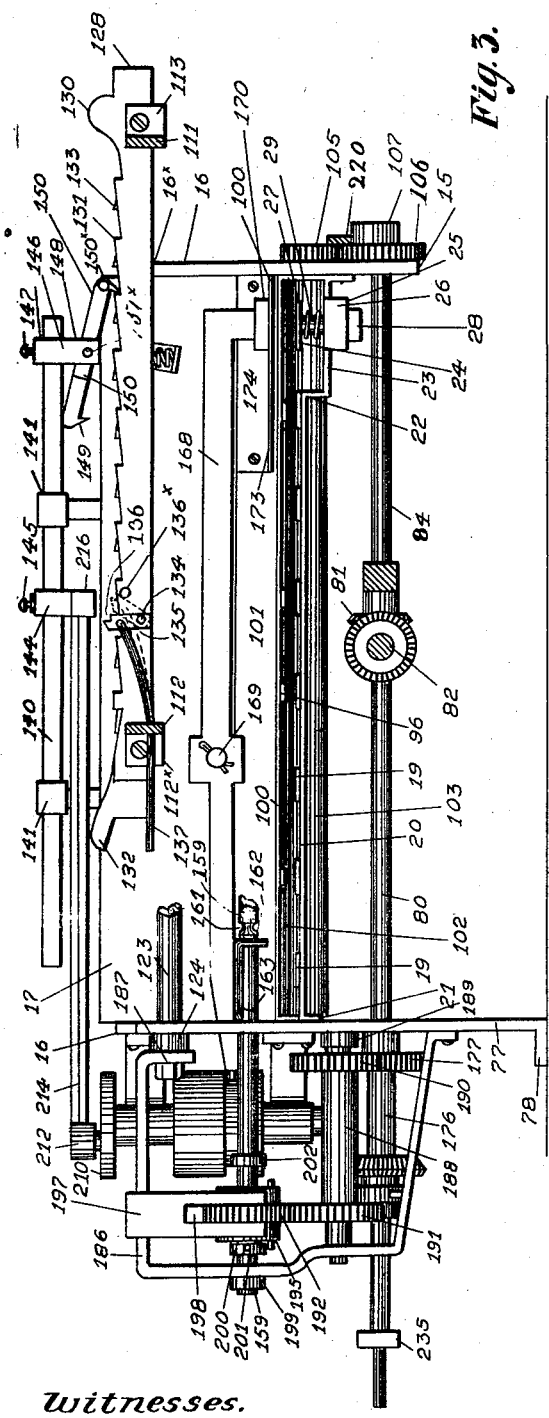
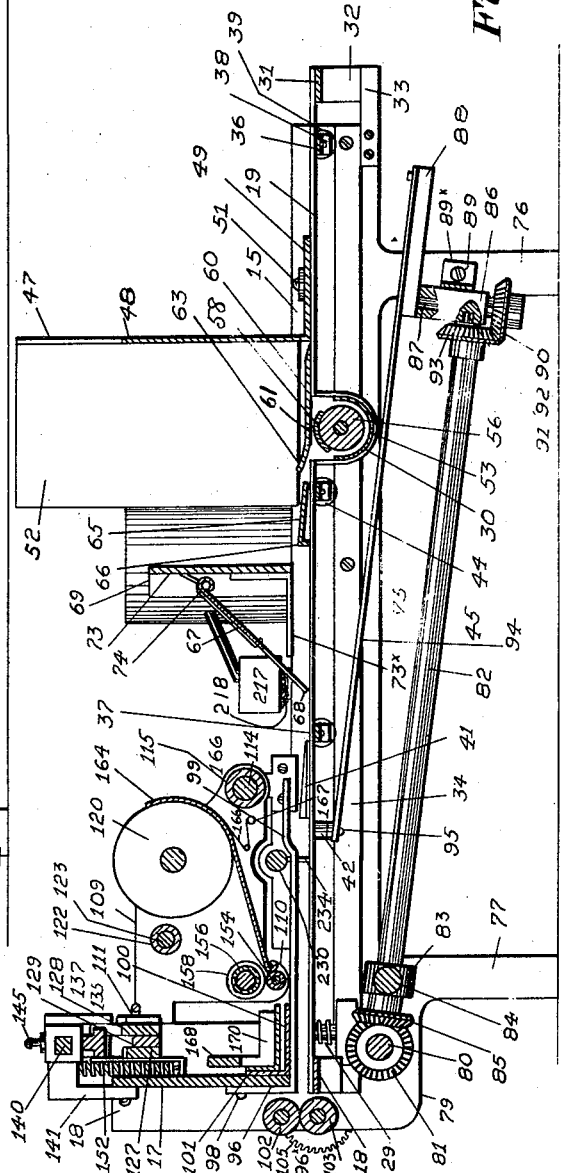
Witnesses.
Inventor.
Frederick R. S. Ditmars
By Rich & Manning
Attorney.

F. R. S. DITMARS.
STAMP AFFIXING AND ENVELOP SEALING MACHINE.
APPLICATION FILED MAR. 1, 1909.
1,001,001.
Patented Aug. 22, 1911.
6 SHEETS—SHEET 4.
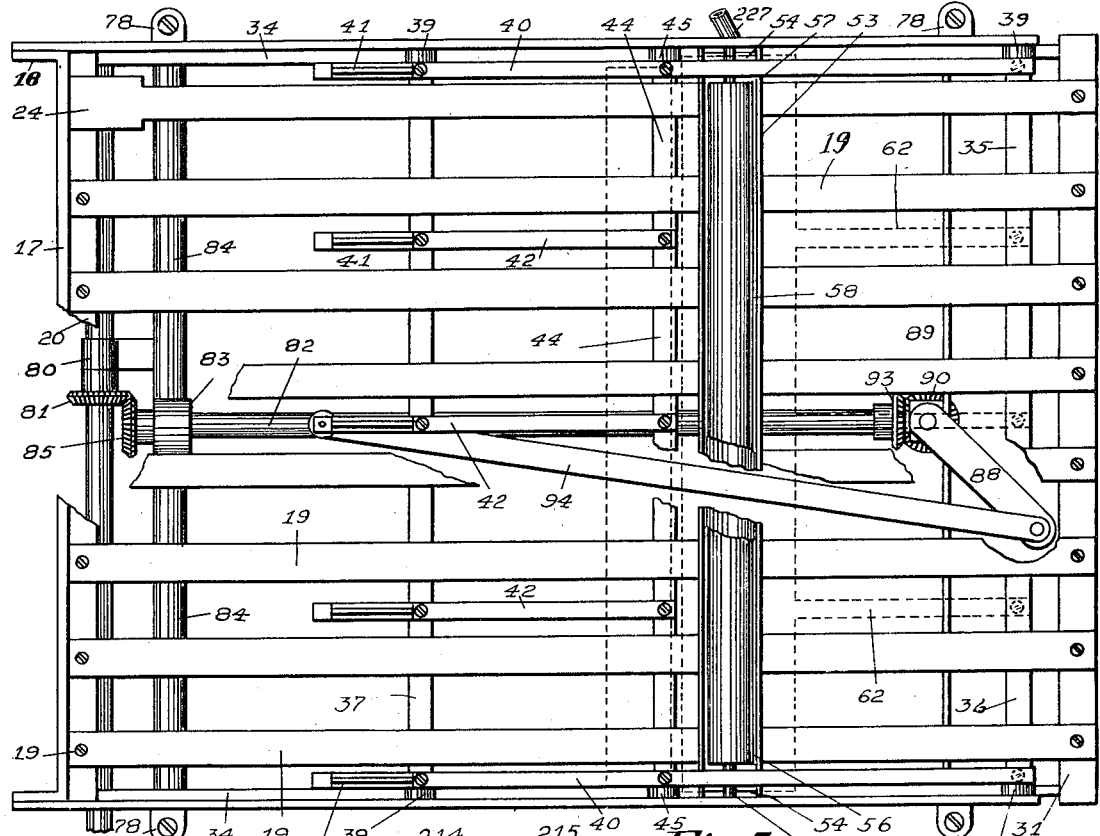
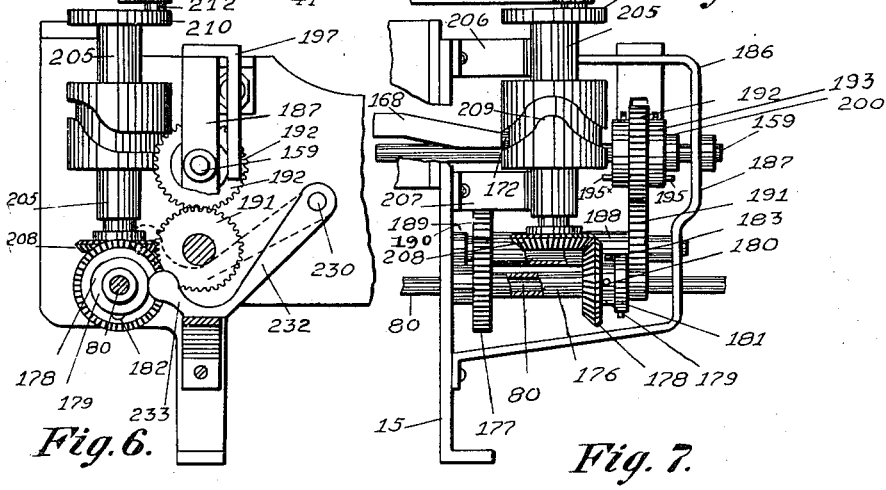

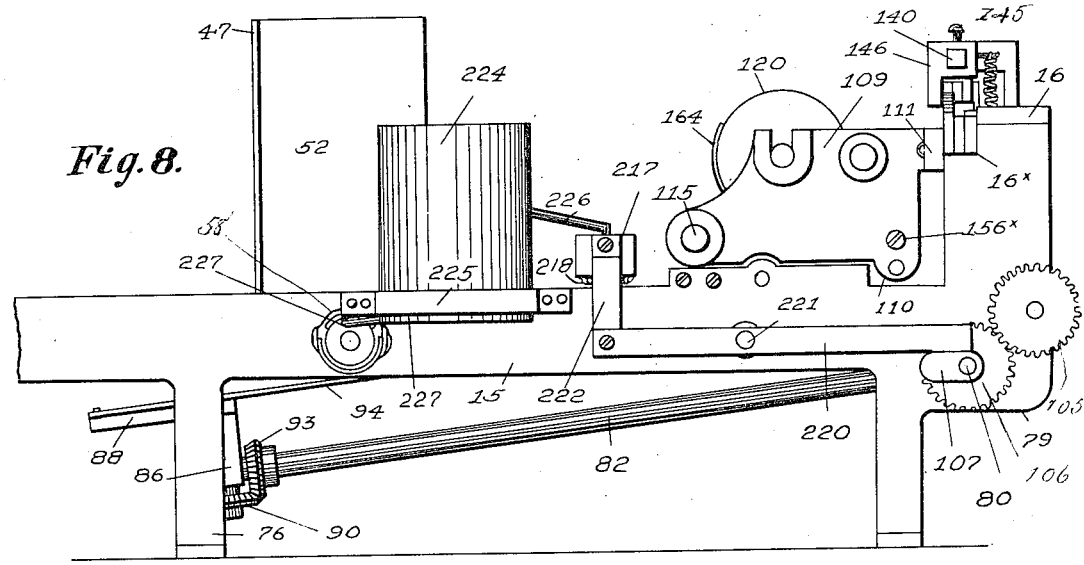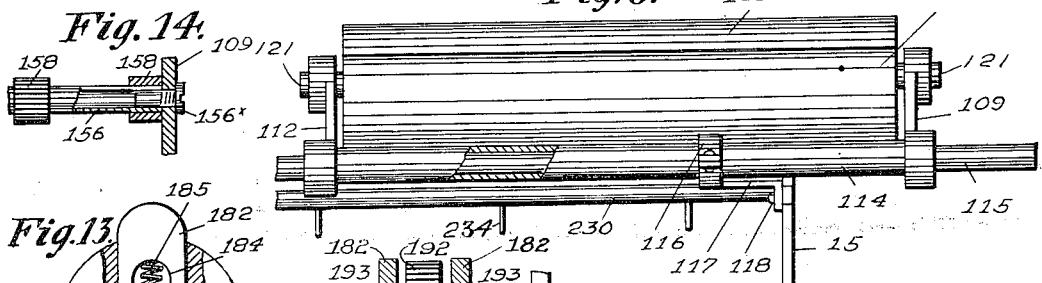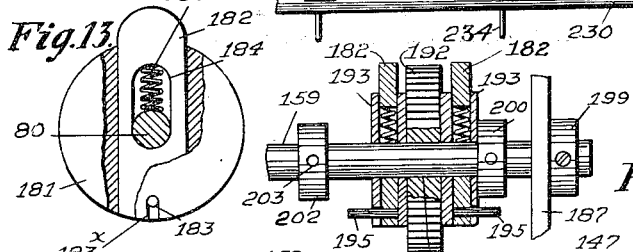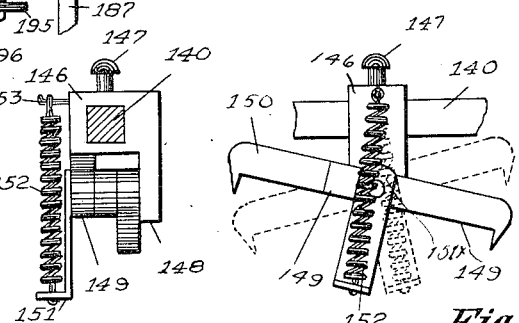

UNITED STATES PATENT OFFICE.

FREDERICK R. S. DITMARS, OF KANSAS CITY, MISSOURI, ASSIGNOR OF TWO-THIRDS TO WILLIAM C. RENFROW, OF KANSAS CITY, MISSOURI.

STAMP-AFFIXING AND ENVELOP-SEALING MACHINE.

1,001,001. Specification of Letters Patent. Patented Aug. 22, 1911.

Application filed March 1, 1909. Serial No. 480,752.

*To all whom it may concern:*

Be it known that I, FREDERICK R. S. DITMARS, a citizen of the United States of America, residing at Kansas City, in the county of Jackson and State of Missouri, have invented certain new and useful Improvements in Stamp-Affixing and Envelop-Sealing Machines; and I do hereby declare that the following is a full, clear, and exact description of the invention, such as will enable others to make and use the same, reference being had to the accompanying drawings, forming a part of this specification.

The invention has for its object: first: the moistening and sealing of the envelop, and the moistening and affixing of the stamps, in the progressive movement of the envelops through the machine, so that these operations may be performed rapidly and in the proper sequence; and second: to control the action of the stamp-affixing mechanism upon the completion of the movements and the final discharge of all the envelops from the machine.

The invention consists in the novel construction and combination of parts, such as will be first fully described and then specifically pointed out in the claims.

Figure 1:
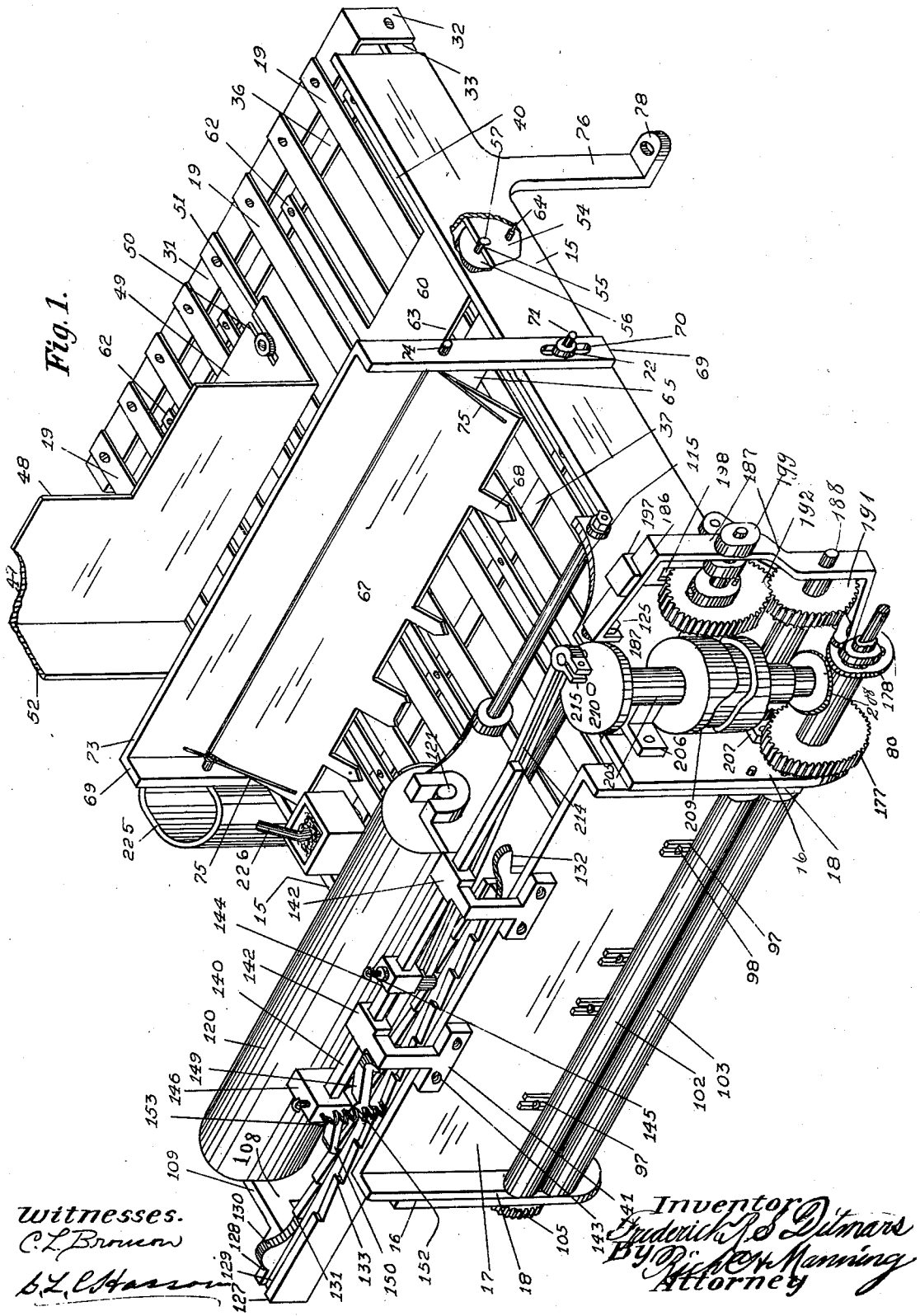
Figure 2:
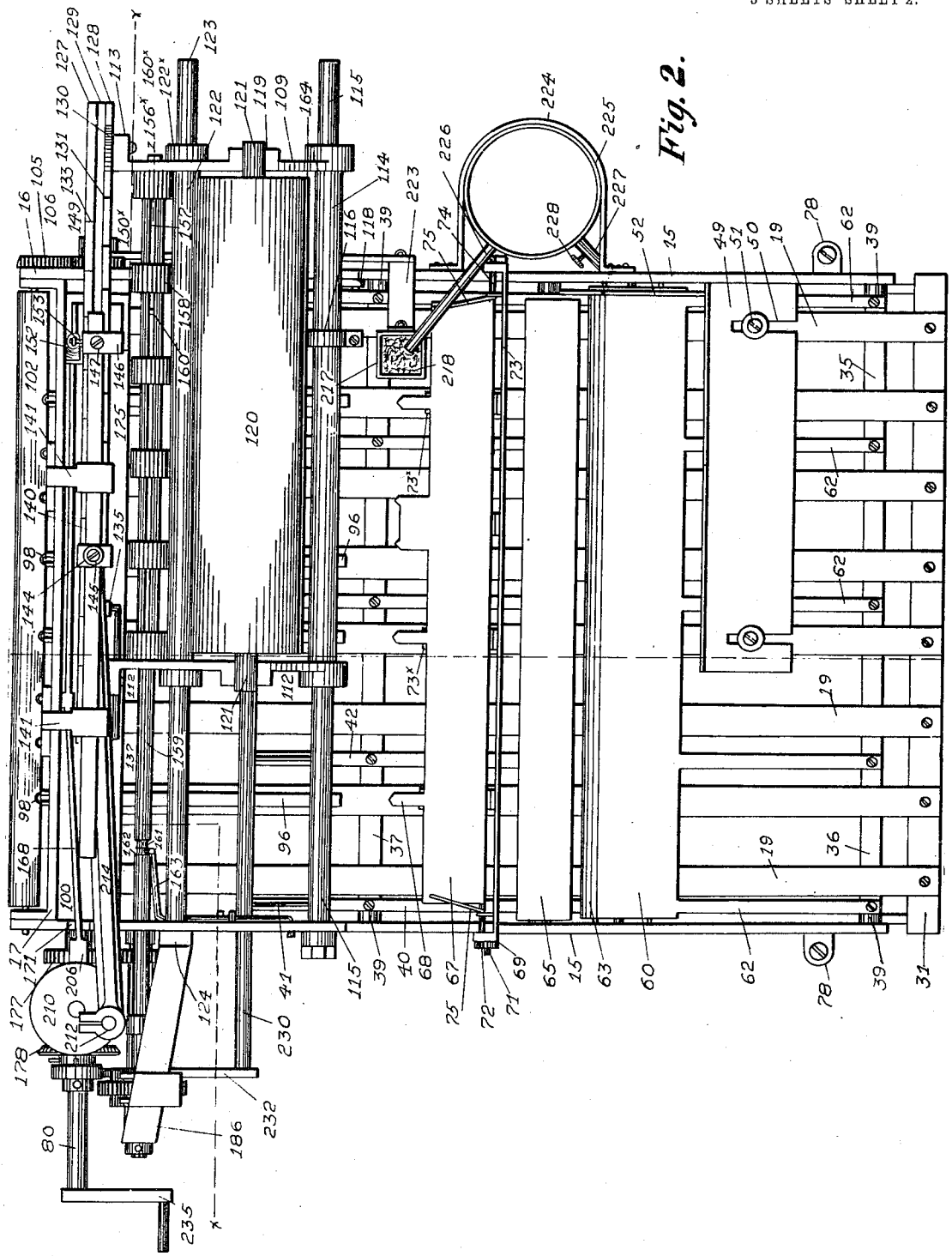

In the drawings: Figure 1. is a view, in perspective, of the novel stamp-affixing machine, in readiness to receive the envelops and to be fed through the machine, the stamp-affixing mechanism being out of gear, the position of the reciprocating carriage carrying the stamp-roller being shown in its movement inwardly toward the position of the applied power. Fig. 2. is a plan view of the machine as seen in Fig. 1. Fig. 3. is a transverse, vertical, sectional view of the machine, taken upon the line $x$, $x$, on Fig. 2, looking forwardly. Fig. 4. is a longitudinal, vertical, sectional view of the machine, taken upon the line $y$, $y$, on Fig. 2. Fig. 5. is a plan view, in detail, of the frame of the machine, showing the longitudinal bars forming the table, the track rails on the inner portions of the sides of the frame, and the reciprocating envelop feeder frame, mounted on the track rails, the transverse main power shaft, the mechanism actuated by the said shaft for actuating the envelop feeder, and the transverse receptacle for the moistening devices for moistening the sealing flap of the envelop, the initial feeder plate being shown in dotted lines above the moistening roller, and the forward end plate broken away. Fig. 6. is a detail view of the forward end portion of the side plate upon the left hand side of the main frame showing the main power shaft in section, also showing the mechanism actuating the stamp carrying feeding and affixing devices, and the devices for throwing the latter out of gear. Fig. 7. is a detail view of the portion of the side frame and mechanism as seen in Fig. 6, and taken from a position at right angles thereto and looking rearwardly from the forward end of the machine. Fig. 8. is a side view, in elevation, taken upon the right hand side of the machine and of the portion of the machine at its forward end showing the reciprocating, stamp-supporting and feeding carriage, the envelop moistener and the operating mechanisms, a portion of the side of the main frame being broken away to show the end of the receptacle and conductor. Fig. 9. is a detail rear view of the reciprocating carriage and stamp-carrying roller, showing the tube on the carriage connected with the outer end of the supporting rod on the main frame of the machine, showing the clamp on the rod, also showing the side plate of the main frame in section, and the arm or bracket connecting the clamp with the side plate; also showing a portion of the rod for throwing the stamp-feeding devices out of gear, and the pins on the rod, in the path of the envelops. Figs. 10 and 11 are detail views of the hooks engaging with the ratchet teeth on the reciprocating carriage, from a position forward of the carriage and also longitudinal thereto, showing the positions of the hooked catches operatively. Fig. 12 is a detail view, in perspective, of a portion of the front plate of the main frame of the machine, showing the plates between which the stamps are separated from the sheet, also showing a portion of the reciprocating carriage carrying the sheet of stamps, and the upper and lower feed rollers, and a portion of the yielding plate beneath the stamp carrying roller. Fig. 13 is an enlarged, detail, side view of the clutch on the main power shaft. Fig. 14 is a detail side view of a portion of the outer end of the slotted tube showing a portion of the side of the reciprocating carriage and slotted tube, in vertical section. Fig. 15. is a detail, vertical, sectional view of the gear and clutch controlling the movement of the stamp-feeding devices, taken from the front of the machine.

Similar numerals of reference indicate corresponding parts in all the figures of the drawings.

Referring to the drawings, the main supporting frame of the machine, as shown is rectangular in form. This frame consists of the longitudinal side plates 15, which are narrow in width, and at the forward end of which plates are upward-extensions 16, extending a considerable height and in vertical planes with the sides 15, the extension upon the right hand side of the machine being narrow in width, the upper end being notched at 16x, while upon the left hand side the extension extends rearwardly a considerable distance, and is curved downwardly and rearwardly. At the forward end of the main frame is a transverse end plate 17, narrow portions 18, of the ends of which plate are bent at right angles and extended forwardly to a position in vertical lines with the forward ends of the upward extensions 16, of the side plates 15, and secured rigidly thereto. The upper surface of this plate extends upwardly a short distance above the line of the upper surface of the extensions 16, of the side plate, and its lower, longitudinal surface extends downwardly to a position a slight distance above the line of the upper surface of the sides 15, of the frame in rear of the extensions, as seen in Figs. 3 and 4.

The table or bed of the machine and upon which the envelops are grouped and fed to the stamp-affixing devices consists of a number of narrow plates or slats 19, arranged at short distances apart and extending in the longitudinal direction of the sides of the machine. The forward ends of these plates or slats extend to a position beneath the lower surface of the front end-plate 17. The support for said forward ends of the slats 19, consist of a transverse flat plate 20. A downwardly-bent portion 21, of said plate, is secured rigidly to the inner surface of the side 15, upon the left-hand side of the main frame, and from said point of connection the plate extends longitudinally to a point 22, in the direction of and a short distance inwardly from the inner surface of the other side 15, at which point a portion of the plate is bent at right angles and extended downwardly a short distance, thence bent at right angles and extended to and connected rigidly with the inner surface of the side 15, on the right hand side of the main frame of the machine, forming a depressed portion 23, of the plate 20. The forward end of one of the slats 19 extends above this depressed portion 23, and is provided with a rectangular shaped end 24, as seen in Fig. 5. With the lower surface of the depressed portion 23, of plate 20, is connected a casting 25, through which and the portion 23 of the plate 20, extends a perforation 26.

27 is a bolt extending through the perforation 26, and connected at its upper end with the lower surface of the portion 24, of the slat 19. Upon the lower end of the bolt is a head 28, bearing upon the lower surface of the casting 25. Extending around the bolt 27 is a spiral-spring 29, its lower end bearing on the upper surface of the casting 25, and its upper end supporting, yieldingly, the end portion 24, of the slat 19, and upon which the portion of the envelop upon which the stamp is affixed is supported. The rear end portions of the slats or plates 19 extend rearwardly to a point approximately two-thirds the distance from the forward to the rear end of the main frame, at which point the slats are bent downwardly in a single curved line, as at 30, and then extended rearwardly from said curved line to a position a short distance in rear of the line of the rear ends 15, of the main frame 14. With the lower surfaces of the rear ends of the plate 19 is connected rigidly a transverse connecting bar or plate 31. The ends of the bar 31 are bent at right angles, and portions 32 are extended downwardly to a position in line with the lower surfaces of the rear ends of the sides 15, and are connected rigidly to the outer surfaces of bars 33, on said sides of the main frame, as seen in Figs. 1 and 4. To the inner surfaces of said sides 15, directly above the line of the short bars 33, are secured the horizontal track bars or rails 34, the upper surfaces of which bars are in positions about midway the lines of the upper and lower surfaces of the said sides 15, of the main frame. The bars extend from the line of the rear end of sides 15, and terminate at a point a short distance in rear of the inner surface of the front plate 17, at the forward end of the main frame.

The forward impulse to the envelops is given by the power imparted from a reciprocating envelop carrier frame 35. This frame consists of a narrow transverse rear end bar 36, beneath the slats 19, and located inwardly from and parallel with the rear end supporting bar 31, for said slats; and the forward, transverse bar 37, located about midway the line of the forward ends of the slats 19, and the curved portions 30, of said slats. The ends of these bars extend downwardly to form shoulders 38, and to which are pivoted the small rollers 39, which bear upon the upper surface of the track bars 34. With the upper surface of the transverse bar 36, adjacent to the wheels 39, are connected fixedly the rear ends of the narrow strips or bars 40, the forward ends of which strips extend to and are connected rigidly with the upper surface of the transverse bar 37, and also extend a short distance forward of the lines of said bar. Upon the upper surface and forward ends of the bars 40 are fixed the envelop ejecting and feeding blocks 41, the upper surfaces of which are rearwardly inclined as seen in Figs. 4 and 5.

Between the centrally located slats 19, and also between the pairs of slats upon each side of the said centrally located slats are narrow strips or bars 42, which are short in length, and are also in the same horizontal plane as slats 19, and connected rigidly with the upper surface of the transverse bar 37, and extend forwardly precisely the same distance as the forward ends of the bars 40, and are also provided with the inclined blocks upon their upper surfaces, which are the same as the inclined blocks 41. The rear ends of these strips are secured to the upper surface of a transverse bar 44, located a proper distance forward of the downwardly curved portions 30, of the longitudinal slats 19. This transverse bar 44 is the same in construction as the forward transverse bar 37, and is secured to the under side of the longitudinal strips or bars 40, and provided with rollers 45, movable on the track bars 34.

47 indicates the vertical holder for holding temporarily in position a pack or stack of envelops to be stamped. This holder is located upon the right hand side of the machine, and upon the upper surface of the slats 19, forming the table to the machine. The back 48, of the envelop rack or holder, is provided with a rearwardly extended flange 49, in which are slots 50, and through said slots extend the adjusting screws 51, which screws are secured to the slats 19. The back 48, of the holder for the envelops, is adjusted in position upon the slats 19, the proper distance in rear of the downwardly curved portion 30, of said slats, which as shown is about one-half the width of an ordinary envelop. As shown the back 48 extends transversely to the machine, the length of an ordinary commercial size envelop. For official size envelops the back 48 would be of course extended. The stackholder 47, has an end 52, extending forwardly parallel with and adjacent to the side 15, on the right hand side of the machine, its lower surface being a short distance above the plane of the slats 19. (See Fig. 4.) Within the curved, depressed portions 30, of the slats 19, is secured fixedly a trough 53, extending from the inner surface of one side 15, of the machine, to the inner surface of the other side. The trough is semi-circular in cross-section, and provided with ends 54, also semi-circular the upper surfaces of which side and ends are below the horizontal line of the lower surfaces of the strips 40, of the reciprocating frame 35.

In the ends 54, of the trough, are slots 55, and within the trough is a roller 56, circular in cross-section and provided with pivot bearings 57, resting in the slots 55. (See Figs. 1 and 5.) Upon a portion of the surface of the roller 56 is a concentrically attached absorbent 58, consisting of felt, or like substance, and in the position of the roller is upon the surface upward.

60 indicates the envelop transferer and feeding plate for the envelops, which is made of the proper width to feed the envelops from the pack in rack 47, and is located above the roller 56, its ends extending to a position above the upper surface of and attached to the bars 40, of the reciprocating frame 35. Upon the lower surface of the plate 60 and on the portion of said plate movable over the roller 56 is an absorbent 61, composed of felt or like substance, the thickness of which absorbent 58 on roller 56, being such as to come into contact with the felt or absorbent 61, and compel the rotation of the roller 56 in such a degree as to extend a portion of the absorbent 58 within the lower portion of the trough 53, in the reciprocal movement of the frame 35. With the rear portions of the plate 60 are connected the forward end portions of narrow plates 62, the rear ends of which plates are connected fixedly with the upper surface of the transverse bar 36, of the reciprocating frame 35, shown in dotted lines in Fig. 5. The forward end portion 63, of the feed plate 60, is inclined in the proper degree forwardly and upwardly, so as to enter beneath the sealing flap of an envelop placed thereon. Within the end 54, of the trough or receptacle for roller 56, on the right hand side of the machine, is a drain tube 64, which extends through the side 15, of the main frame, (see Fig. 1) and leads from the bottom of the trough.

65 indicates a separate feed plate, of the same length and positioned in advance of the feed plate 60. This feed plate 65 is narrow in width, and is provided with a forwardly and downwardly-extended portion 66, attached to the bars 40, on the reciprocating frame 35. The said portion 66, of the feed plate 65, serves to incline the said plate 65 rearwardly and downwardly in the proper degree, the position of the rear end of said plate 65 being but a short distance in advance of the upwardly-inclined portion 63, of the feed plate 60.

For the purpose of holding and guiding the envelops advanced by the feed plate 65 on the reciprocating frame 35, and at the same time producing uniformity in movement, a plate 67, extending transversely to the machine is inclined forwardly and downwardly, and provided with fingers 68, which bear upon the upper surface and bed of the machine. These fingers are shown varying in width, but may be uniform if preferred.

In order to support the plate 67, in position and in advance of the moving feed plate 65, upon the outer surface of the sides 15, of the main frame are secured adjustably the standards 69, in the lower ends of which are slots 70, through which extends the bolts 71, and upon which are the adjusting nuts 72. With the rear surfaces of the standards 69 are integrally connected the ends of a vertical plate 73, the lower surface of which plate extends downwardly to a position approximately in line horizontally with the upper surfaces of the side 15, of the main frame. Through the standards 69, at a point a considerable distance above the line of the upper surfaces of the sides 15, to give the incline to plate 67, extends a rod 74, the upper portion of the plate being bent around the rod as seen in Fig. 4. In order to keep the fingers 68 under tension, wire springs 75 are wound around the ends of rod 74, one end bearing on the upper surface of plate 67, and the other secured to plate 73. (See Fig. 1.)

Guide bars 73$^x$, for the envelops, extend forwardly from the line of the lower surface of the plate 73, to a position in rear of fingers 68, the rear ends of which bars are bent at right angles and extend upwardly and are secured by brazing to the forward surface of said plate 73. (See Figs. 2 and 4.)

The mechanism operating the reciprocating carriage 35 is located beneath the slats or table of the main frame of the machine, which frame is supported by the legs 76, located on the side plate a short distance forward its rear ends and legs 77 located a short distance in rear of the forward ends of said plates 15, the said legs being provided with outwardly-extended, perforated flanges 78, for attachment to the table. At the forward end of the machine, the portions of the side-plate 15 forward of the legs 77 extend downwardly a short distance and also inwardly to said legs, as seen at 79. through and journaled in which downward extensions of plate 15 at points upon the line of the lower surfaces of plates 15, in rear of legs 77, and also a slight distance in rear of a vertical line passing the rear surface of plate 18, supporting the bars 19, extends the main driving power shaft 80, of the machine.

The end of the shaft upon the right hand side of the machine extends outwardly a considerable distance beyond the line of the outer surface of plate 15, as further described. Upon a portion of shaft 80 intermediate the sides 15, of the main frame, is a bevel gear 81. A longitudinal power-shaft 82, is extended from the shaft 80, near the gear forwardly to a position a short distance forward of a line extending transversely to the machine through the rear legs 76. The forward end of the shaft 82 is mounted in a bearing 83, secured in position by the separate round bars 84 the approximate height of shaft 80, the inner ends of which bars are rigidly connected with the bearing 83, the outer ends of said bars being secured rigidly to the lower surfaces of the side plates 15, of the main frame, immediately above the line of connection of legs 77. Upon the said forward end of shaft 82 is a bevel gear 85, which meshes with the bevel gear 81, on shaft 80. The rear end of shaft 82 is inclined downwardly to give room for connecting with the table, and in a transverse line with the forward surfaces of the rear legs 76, is arranged at a slight angle to said surfaces a bearing 86, in which is a shaft 87, upon the upper end of which shaft is a crank-arm 88. This bearing 86 is supported in position by a single transverse plate or bar 89, extending to the inner surfaces of both rear legs 76, at a point a little above an intermediate point from the lower ends of said legs to their point of connection with the side plates 15. The ends of bar 89, are bent at right angles and secured to the legs 76, by screws 89$^x$. (See Fig. 4.) The lower end of the shaft 87 extends a short distance below the line of the lower surface of bearing 86, and upon said end is a bevel gear 90. Upon the rear end of shaft 82 is a reduced portion or pivot 91, which extends within an opening 92, in the forward surface of the casting or bearing 86, at a point a short distance above the lower end of said bearing.

Upon the shaft 82 is a bevel gear 93, which meshes with the bevel gear 90. (See Figs. 4 and 5.) With the crank arm 88 is connected one end of a connecting bar 94, the other end of which bar extends forwardly and also inclined upwardly to a position beneath the forward end of one of the short bars 42, carrying the feed blocks 41, on the reciprocating carriage 35, and located above the shaft 82. Upon the said lower surface of said bar is a pivot bolt 95, which connects the bar with the bar 42 and by means of which a reciprocal movement is given the carriage 35.

In order to guide the envelops upon leaving the guide fingers 68, a number of horizontal bars 96 are located above the alternate slats 19, of the table, the forward ends of which bars extend forwardly directly beneath the lower surface of the front plate 17, and the forward end portions are bent at right angles and extended upwardly upon the outer surface of plate 17. These ends of the bars 96 are slotted at 97, and secured to said plate 17 by adjusting screws 98, and between the lower surfaces of said bars and upper surfaces of bars is formed the adjustable delivery opening 96ˣ, for the envelops. The rear ends of bars 96 are curved upwardly in a slight degree at 99, and thence extended rearwardly the proper distance to guide the envelops which pass over the inclined surfaces of the blocks 41. To the lower portion and inner surface of the front plate 17 and directly above the bars 96, is secured a horizontal plate 100 of considerable width. Upon the upper surface and at one end of this plate 100, the stamps are fed as further described. This plate extends from the inner surface of one extension 16, of the side plates 15, on the left hand side of the machine to the inner surface of the upward extension on the right hand side of the machine, and is approximately the width of the latter extension. This plate 100 is provided with a vertical flange 101, in its inner portion, which is secured fixedly to said front plate 17. At the forward end of the machine opposite the delivery opening 96ˣ, for the envelops, are the parallel upper roller 102 and lower roller 103. These rollers are journaled at their respective ends on the forwardly extended flanges 18, on the front plate 17. The journal on the lower roller 103, extends through the flange 18, and the upper extension 16, of the side plate 15, upon the right hand side of the machine a short distance, as seen in Fig. 8, and upon said journal is fixed a gear wheel 105. Upon the end of the main power shaft 80, which also extends through the said flange 18 and the lower extension of the side plate 15, is a gear wheel 106, which meshes with the gear wheel 105. Upon the extended portion of shaft 80 and upon said portion of the shaft adjacent to the gear wheel 106, is a cam wheel 107, for the purpose further described.

The stamp feeding and affixing mechanism is located directly in rear of the front plate 17, at the forward end of the machine. The stamp supporting and feeding mechanism consists of a reciprocating carriage frame 108, which moves transversely to the main frame of the machine, and in length is approximately two-thirds the width of said main frame. The outer end of the carriage frame consists of a flat plate 109, short in length, having a horizontal upper surface and rear curved end portion, in a plane horizontal with the upper surface and rear end of the upward extension 16, of the side 15, upon the left hand side of the machine, the rear, curved end of the plate 109 being similar to the said extension. The lower surface of the plate 109 is considerably above a line transverse to the machine and extending upon the upper surface of the side plate 15, of the main frame. Upon the lower surface of the plate 109 adjacent to the forward end is a downward, curved extension 110, and upon said forward end and adjacent to its upper surface is a forward extension 111, upon which is a flange 113. (See Fig. 3). The inner end of the carriage consists of a plate 112, of the same proportion and like in construction to the end portions of the respective plate 109, and having flanges 112ˣ, which are the same as flanges 113. With the inner surface and lower rear end portions of the respective plates 109 and 112 is connected rigidly the ends of the hollow bar or tube 114, which tube extends through said plates.

With the lower, rear portion of upward extension 16, of the side plate 15, on the left hand side of the machine, is connected rigidly one end of a rod 115, the other end of which rod is extended through the tube 114, and is of sufficient length to permit the full movement outwardly of the reciprocating carriage 108. The tubular connection 114 for the carriage, is supported upon the right hand side of the machine by means of a clamp 116, embracing the tube with which clamp is connected an arm 117, extending toward the inner surface of the side 15, the outer end of the arm being connected rigidly with a bracket 118, on the inner surface of said plate. (See Figs. 2, 4 and 8). In the upper surfaces of the sides 109 and 112 of the reciprocating carriage and near the rear point of the downward curve are the slots 119.

120 indicates the roller upon which the sheets of stamps are rolled prior to use in the ends of which are pivots 121, which pivots are supported within the slots 119, of the sides of the carriage. The length of the roller is slightly less than the tube 114. A tube 122 is rigidly connected with the upper portion of sides 109 and 112, a short distance forward of the roller 120, and extends through boss 122ˣ, on said sides, upon the same horizontal plane as the pivots to the roller 120. Through the tube 122 extends the outer end of a rod 123, and to the same distance as rod 115, in the tube 114. The inner end of the rod 123 extends through the extension 16, of the side plate 15, on the left hand side of the machine and is provided with a head 124, on the outer surface of said extension, and upon which head is a screw-threaded bolt 125, for the purpose further explained.

To the flanges 112ˣ and 113 of the respective sides 109 and 112, of the reciprocating carriage 108, are secured the respective horizontal outer and inner bars 127 and 128, which traverse with the carriage. These bars are arranged flatwise together, and between said bars is a flat separating bar 129, the upper surface of which is lower than the upper surface of bars 127 and 128. (See Fig. 1). Upon the upper surface of the inner bars 128, at its outer end, is fixed a cam block 130, its surfaces being curved downwardly and gradually to the upper surface of the bar.

Ratchet teeth 131 are formed upon the upper surface of the bar, of the width of a stamp apart and in series, and extending from the rear inclined portion of cam 130 to the forward end of the bar, the inclination of the ratchet teeth being toward the outer end of the bar and in number exceeding by one the number of stamps usually in the rows in the ordinary official stamped sheet.

Upon the inner end of the outer bar 127 which is adjacent to the front plate 17, is a cam 132, similar to the cam 130, and in the upper surface of said bar 127 are ratchet teeth 133, wide apart and inclined in an opposite direction to the ratchet teeth 131, said teeth 133 alternating in position on the bar 127 to the position of the ratchet teeth 131. (See Figs. 1, 2 and 3). These ratchet-toothed bars move in the notch $16^x$, of the extension 16, on the right hand side of the machine, and are afforded a bearing in said notch.

At a point on the vertical surface of the rear bar 128, from the inner end, in advance of the vertical line of the last ratchet tooth when in its forward position is pivotally connected at 134 the lower end of a tripping plate 135, the upper end of which plate extends a short distance in height above the vertical plane of the ratchet teeth 131, and the rear portion of said upper end is inclined upwardly and forwardly, to a point. In the forward portion of the upper end of said plate 135 is a notch 136. (See Fig. 3). With the upper end of said plate 135 is pivotally-connected the forward inwardly-bent end of a rod 137, the rear end of which rod extends through the extended portion of the side 112, of the reciprocating carriage 108, and to a position a short distance inwardly from the line of the inner end of the bar 128, and comes into contact with the inner surface of the upward extension 16, of the side 15, on the left hand side of the machine and moves said trip plate 135 forwardly into contact with the stop pin $136^x$.

A short distance above the ratchet-toothed bars 127 and 128 is a reciprocating bar 140, as shown rectangular in cross-section. This bar is supported in the slotted ends 142, of the brackets 141, which are secured fixedly to the upper portion of the outer surface of the front plate 17, at 143, thence extended upwardly and bent at right angles rearwardly, to a position above the ratchet-toothed bars. These brackets 141 are located upon the front plate about equi-distant from the flanged portions 18, of the front plate. Upon the intermediate portion of the bar 140 is a slotted bar 144 held by the set screw 145.

Upon the outer end of the bar 140 is a block 146, adjustably connected with the bar 140, by the set screw 147. From the outer and inner, lower side portions of the block extend downwardly the plates 148, in the lower portion of which plates are two oppositely arranged, hooked catches 149 and 150. These catches consist of wide bars, secured or cast together in the same horizontal plane, the catch on the outer end of the bar 149 engages with the ratchet-teeth on the bar 127, and extends inwardly and the catch on the bar 150 is upon the outer end of the bar and engages with the ratchet teeth on the inner bar 128, the inner ends of both bars being cut away. These bars are secured at a point intermediate the hooked ends to a pivot $151^x$, extending transversely through the bars and the lower ends of the plate 148, and secured rigidly to said bars. With the end portion of the pivot $151^x$ in the direction of the front plate 17, is connected a crank-arm 151, extending downwardly a short distance, and with the arm of the crank is connected the lower end of a spiral-spring 152, the upper end of which spring is connected with a pin 153, on the adjacent side of the block 146, on the reciprocating bar 140. (See Figs. 1, 10 and 11). Upon the side portion of the bar 150 is a pin $150^x$, which comes into contact with the plate 135, on the bar 128 and communicates a grasshopper movement to the catch bars 127 and 128.

To the inner surfaces of the lower, forward ends of the sides 109 and 112, of the reciprocating carriage and also to the downward curved extensions 110 is pivoted the sides of a small feed roller 154, upon the outer surface of which roller are annular milled rollers or enlargements 155, slightly larger in circumference than said roller and arranged at both ends and intermediate said ends of said roller, the number as shown being sufficient to move the stamps in a row in a sheet of stamps, and spread apart as seen in Fig. 12. Directly above this roller 154 is a hollow rotary tube 156, in which is longitudinal key-way or slot 157. Upon the outer surface of the tube is a number of stamp feeding rollers 158, of considerable size, the outer surface of which is serrated. The tube 156 is about twice the circumference of roller 154, and the inner surface of the enlargement above the slot 157 is serrated. The enlargements upon the tube and roller are in contact with each other. The tube 156 is supported by the shaft 159, which passes through the sides 109 and 112 of the reciprocating carriage and through said tube. The inner end of the shaft extends through the side plate 15, on the left hand side of the machine, and a considerable distance from the line of the outer surface for power connection as further described. In Fig. 3 of the drawing this shaft is shown cut away on the line $x\ x$ Fig. 1. A screw $156^x$, extends through the side plate 109 of the reciprocating carriage, into the end of tube 156 and supports the tube. In the outer end of the rod is a key 160, which comes into contact with the screw 156×, in the inward movement of the carriage 108, and with the inner surface of the side 112, of the reciprocating carriage when said carriage completes its outward movement. The rod 159 has a sliding movement of a slight extent, and upon said rod a short distance from the inner surface of the side 15 on the left hand side of the machine, are two grooves 161 and 162, extending around the rod a slight distance apart, leaving a short rib between the grooves. A spring-plate 163 is connected with the side plate 15, of the main frame, the outer end of which plate extends downwardly and enters one of the grooves 161, 162. (See Figs. 2 and 3). In the sliding movement of the shaft 159, the end of the plate 163 moves from one groove to the other.

In order to keep the sheet of stamps close to the roller 120, a plate 164 is extended in a curved line concentric with and close in position to the rear surface of the roller, and then extended forwardly and downwardly to rear portion of the small roller 154, and secured to a small rod 165, which rod is connected at its ends with the inner surfaces of the sides 109 and 112, of the reciprocating carriage 108. (See Fig. 12). The upper portion of the plate 164 is held in a yielding position by means of the spring-plate 166, secured to the pins 167 on the inner surface of the sides 109, 112, of the reciprocating carriage. (See Fig. 4).

The stamp-affixing device consists of a straight lever bar 168, located on the inner surface of the front plate 17, of the main frame of the machine, and pivoted to the pivot 169, on said front plate located a short distance above the transverse plate 101, and a short distance toward the left hand side plate 15, from a point intermediate the right and left hand side plates. The end of the lever in the direction of the right hand side plate 15 terminates a short distance therefrom, and a portion is bent at right angles and extended downwardly, and with said portion is connected the stamp separating plate 170, which is rectangular in form and the size of an ordinary official stamp. The other end of the lever 168 is bent rearwardly a slight distance from the front plate 17, and extends through a vertical slot 171, in the left hand side-plate 15, of the main frame, and upon said end is an anti-friction roller 172. (See Fig. 7).

A slight distance above the upper surface of the plate 101 and the end portion of said plate toward the side 15, on the left hand side of the main frame is a horizontal plate 173, (see Figs. 3 and 12), short in length, upon the rear portion of which is an upwardly extended flange 174, secured fixedly to the inner surface of the front plate 17. In said plates 173 and 101 directly beneath the stamp-separating plate 170, on lever 168, are openings 175, registering with each other and rectangular in form, and adapted to admit the passage of the stamp separating plate 170. (See Figs. 2 and 12).

Upon the left hand side of the main frame of the machine and adjacent to the outer surface of the upward extension 16, of the side plate 15, is located the mechanism for governing and transmitting power to the carriage feeding the envelops, the reciprocating carriage for feeding the stamps and the stamp affixing devices, and also envelop moistener further described.

Upon the outer end of the main power shaft 80 is loosely mounted a hollow sleeve 176. (See Fig. 7). Upon the inner end of the sleeve is mounted a gear wheel 177, and upon its outer end is mounted a bevel gear wheel 178. Upon the outer portion of the bevel gear wheel is a hub 179, and upon said hub is a radial pin 180. Upon said shaft 80, near hub 179, is fixedly mounted a clutch wheel 181, in which is a movable clutch plate or bar 182, upon the portion of which plate toward the hub 179 is a pin 183, which pin extends through slot 183×, in wheel 181, and is adapted to come into contact with the pin 180, when said clutch plate moves inwardly. Said clutch wheel 181 is provided with a groove in the surface of one side of the wheel, extending diametrically thereto, in which groove is inserted the clutch bar 182, in the central portion of which plate is a slot 184, the sides of which slot are movable past the adjacent sides of shaft 80. Between the shaft 80 and the upper end of the slot 184, is a spiral-spring 185. (See Fig. 13). The curved end of the clutch plate extends a short distance from spring 185, beyond the line of the periphery of the wheel.

With the head 124 of the rod 123, is connected the downwardly bent portion of the bracket 186, which is secured to said head by the nut 187. The upper portion of the bracket extends outwardly a suitable distance and is inclined forwardly at an angle to the extension 16, of the side plate 15, thence bent at right angles and a portion 187 extended downwardly to a position in rear and a short distance below the position of shaft 80, thence inclined downwardly and extended inwardly and connected with the side plate 15, of the main frame of the machine. In the vertical portion 187, of the bracket 186, is journaled the outer end of the shaft 159, operating the stamp feeder. A short distance below said shaft 159 is a short power-transmitting shaft 188, its inner end being journaled in a bearing 189, on the outer surface of the side plate 15, of the main frame, and the outer end journaled in the portion 187, on the bracket 186. Upon the inner end of said shaft is a gear wheel 190, with which engages the gear wheel 177, on the main shaft 80. Upon the outer end of shaft 188 is a large gear wheel 191. Upon the shaft 159, directly above the gear wheel 191, is a gear wheel 192, which meshes therewith. Upon each side of the gear wheel 192 are formed hubs 193, through which extend diametrically the clutch bars 194 actuated by the springs 194$^x$, which are the same in construction as the clutch bars 182, the ends of these bars 194 extending in one direction short distances from the lines of the periphery of the hubs and in parallel planes. Upon the other or inner portions of said clutch bars 194 and upon corresponding ends of said bars are clutch pins 195. The gear wheel 192, with its hubs 193 is loose on the shaft 159 between hubs 200 and 202, (see Fig. 15) to permit the sliding movement of the said shaft. With the upper, horizontal portion of the bracket 186 and rear surface is rigidly connected a plate 197, in which is a vertical slot 198, (see Figs. 1 and 3) the portions of which plate 197, on each side of the slot, extending downwardly on each side of the gear wheel 192, and preventing its lateral movement. Upon the shaft 159 and upon the outer end portion is fixed a collar 199, which comes into contact with the outer surface of the vertical portion 187, of bracket 186, when the reciprocating carriage 108 completes its outward movement. Upon said shaft 159, within the bracket 186 and located thereon in the direction of one of the hubs 193, to give room for lateral sliding of the shaft 159, is fixed a collar 200, in which is a radial slutch pin 201. (See Fig. 3.) Upon the shaft 159 and at a distance inwardly from the inner hub 193, on the gear wheel 192 is fixed a collar 202, which distance corresponds to the distance between the outer hub and the collar 199, on the outer end of the shaft 159. Upon the collar 202 is a clutch pin 203, the position of which clutch pins 201 and 203 extends in opposite directions and from opposite portions of the collars on shaft 159.

205 indicates a vertical shaft arranged above and in vertical line with the outer end of shaft 80. This shaft 205 is supported at its upper end in the shaft hanger 206, connected with the upper end portion of the extension 16, of the side 15, of the main frame of the machine. The lower end of the shaft is supported by a shaft hanger 207, also connected with the said extension 16. Upon the lower end of shaft 205 is connected a bevel gear 208, meshing with bevel gear 178, on the sleeve 176, on shaft 80. Upon said shaft 205, near the upper hanger 206, is connected a grooved cam 209, the groove in which is pitched so as to complete the movement of the lever in one revolution of the cam. Within the groove of the cam extends the anti-friction end of the stamp separating and affixing lever 168.

Upon the upper end of the shaft 205 is a circular plate 210, and upon said plate is a crank pin or wrist pin 212. 214 indicates the connecting rod from the reciprocating carriage 108, upon the outer end of which rod is a clamping collar 215, extending around the wrist pin 212. The inner end of the connecting rod 214 is pivotally connected at 216 to the lower surface of the block 144, on the sliding bar 140. The envelop moistener, for moistening the upper surface of the envelop preparatory to affixing the stamp consists of a small, rectangular-shaped frame 217, located on the right hand side of the main frame of the machine, at a point immediately forward the standard 69 and the inclined plate 67, carrying the yielding fingers 68. In this frame 217 is a sponge 218, held by the inner surfaces of the frame, a portion of the sponge extending beneath the line of the lower end of the said frame.

220 indicates a lever or bar on the outer surface of the main frame of the machine, as seen in Fig. 8, and pivoted at 221 to said side 15, at a point intermediate the ends of the lever. The forward end of the lever extends to a position in the path of the cam 107, on the end of shaft 80. With the inner end of the lever is connected the lower end of a bar 222, the upper end of which bar extends upwardly a short distance above the line of the upper surface of side 15, and a portion 223 is bent inwardly in the direction of the frame 217, and connected with the adjacent side of said frame 217.

In order to keep the sponge moistened in the sponge carrying frame and also the receptacle or trough 53, a tank or reservoir 225 is supported in position adjacent to the side 15, on the right hand side of the main frame with the bottom just below the line of the upper surface of said side, by means of a clamping plate 224, extending around the outer portion of the reservoir and its ends fastened to said side 15 of the main frame. A tube 226 is connected with the side of the reservoir and extends to a position above the sponge in the sponge-holding frame 217. With the lower portion of the inner side of the reservoir is connected one end of a tube 227, the outer end of which tube extends through the side 15, of the main frame, into the trough 53, a cut-off valve 228, in the pipe 227, regulating the supply of water to the trough. The disconnecting means for disconnecting the power from the main shaft to the stamp feeding mechanism consists of a transverse shaft 230, one end of which is journaled at 231, in the upper portion of the side plate 15, on the right hand side of the machine at a point in rear of the upward extension 16, approximately beneath the roller 120, on the reciprocating carriage and a short distance forward the bracket 118, supporting the tube 114. The other end of the shaft extends through the side plate 15, on the left hand side of the machine, and outwardly from the outer surface thereof a considerable distance, and upon said end is an arm 232, which extends to a position in a vertical line with the upper surface of the lower portion of the bracket 186, and the outer portion 233 bent in a curved line and extended upwardly in the path of the end of the clutch plate 112, said contact portion of the arm being curved or rounded. Upon the shaft 230, at suitable points opposite the spaces between the slats 19, forming the table to the machine, are connected the pins 234, which extend forwardly and downwardly within said spaces, and are within the path of the envelops and are raised in position by said envelops in their movement progressively through the machine, the position of the pins 234 and the arm 232 being inclined in about the same plane from the shaft. The power to operate the machine is applied to shaft 80, a crank arm 235 being shown on the outer end of said shaft, for manually operating the machine. Previous to its operation the position of the reciprocating stamp carrying and feeding carriage 108 is at the limit of its inward movement so that the milled feed rollers 158 on the outer end of the tube 156, which acts to feed the stamps is opposite in position to the separating plate 170, on the stamp separating and affixing lever 168 and the outer end of shaft 159 actuating the feed roller 158 is in contact with the screw 156ˣ in the outer end of the tube 156. A sheet of adhesive stamped paper of the usual well-known description and in which the stamps are separated by perforations, is wound on the stamp carrying roller 120. The number of stamps in a row is usually twelve and in series extends the length of the roller. The adhesive surface of the stamped paper is turned outwardly in winding the sheet on the roller 120, and the forward row of stamps is passed between the feed or serrated rollers 154, and the serrated rollers or feeders 158 on the rotary tube 156 to a position between the plates 100 and 173 and opposite the openings 175, in said plate and directly beneath the stamp affixing plate 170 on the lever 168. The sheet of stamped paper on the roller is prevented from unrolling by the yielding pressure applied thereto by the upper portion of the plate 164. The sheet of stamped paper may be of the usual or increased length, as the requirements exist in the performance of the work.

The fluid supplied to the tank 224 moistens the sponge 218, in the frame 217 freely, and a regulated supply is admitted to the trough 53, to be taken up by the absorbent on the portion of the roller entering and leaving the trough alternately. The envelops to be sealed and the stamps affixed thereto are placed collectively in a pack upon the transverse feed plate 60, and held by the hand against the forward surface of the plate or holder 47, and the end portion 52, of said holder, with the flaps of the envelops downward and slightly in advance of the upwardly inclined portion 63, of said plate 60. Power is now applied to the crank arm 235, on the main power shaft 80, and from thence through the bevel gears 90 and 93 and shaft 87 to the crank arm 88, beneath the bed of the machine to the connecting bar 94, and a reciprocating movement is imparted to the carriage 35.

The position of the arm 232 on the transverse shaft 230 carrying the pins 234, being such as to bear firmly upon the lower portion of the bracket 186, the outwardly projecting end of the clutch plate 182 opposite to that carrying the clutch pin, comes into contact with the portion 233, of said arm, in each revolution of the main power shaft, forcing the portion of the plate 182 carrying said clutch pin outwardly and thus avoiding the clutch pin 180, upon the hub 179, on the bevel gear 178, and the power from shaft 80 is disconnected from the stamp feeding and affixing mechanism.

In the rotary movement of shaft 80, the cam 107 on the opposite end of said shaft to that receiving the power, imparts a vibrating movement to the lever 220, and the sponge carrying frame 217 is given a vertical reciprocation, in which movement the sponge carrying frame descends to a position in which the projecting sponge is in the path of the envelops. Upon the initial movement of the shaft 80 and the carriage 35, carrying the feeder plate 60, the upwardly inclined portion 63, of said plate in its forward movement passes above the adhesive surface of the flap of the envelop lowest in position in the pack, and gives a forward movement to the envelop. The felt absorbent 61, which has now moved from contact with the moistened absorbent 58, on the roller 56, comes into contact with the adhesive substance on the flap of the envelop moistening said substance. In the completion of the forward movement of the envelop the envelop is advanced upon the upper surface of the bars 19, of the bed of the machine and transferred to a position beneath the fingers 68, on the plate 67, which rises to admit the passage of the forward portion of the envelop which moves forwardly to the position of the forward portion 66, of the forward feed plate 65, over which the envelop is passed at the beginning of its forward movement. Upon the completion of this first forward movement of the envelop the feed plates 60 and 65 are retracted in position in the rearward movement of the carriage 35. In the next movement forward of said frame the abutting portion of the feed plate 65 imparts a forward transfer movement of the envelop, in which movement the frame 217 carrying the sponge 218 moves downwardly, and the upper surface of the envelop passing said sponge is moistened. In the completion of the latter movement of the envelop the envelop passes over the inclined surfaces of the feeding blocks 41, to a position beneath the plate 100, in which the right hand, forward portion of the envelop is resting upon the upper surface of the yielding plate 24 and beneath the stamp affixing plate 170. In the forward movement of the envelop, its forward portion contacts with the pins 234, on the shaft 230, which now act as fingers to guide the envelops, raising the ends of said pins and partially rotating said shaft and raising the arm 232, in position as seen in dotted lines, Fig. 6, and out of engagement with the clutch plate 182, thus permitting the clutch pins 183, on the clutch plate 182, to clutch the pin 180, on the hub 179, in the rotation of the shaft 80, transmitting rotary motion to the vertical shaft 205 and cam 209, which latter actuates the stamp affixing lever 168 and the stamp affixing plate moves downwardly within the opening in the stamp guiding plate 173, and separating the stamp beneath, and forcing said stamp upon the moistened surface of the envelop, the pressure of the said plate 170 being taken up by the spring 29, on the bolt 28. Upon the succeeding movement of the reciprocating carriage frame 35, the blocks 41, engaging with the rear portion of the envelop carry said envelop forward between the rollers 102 and 103, which now seize the envelop and cause the moistened flap to be firmly closed, and which also eject the envelop from the machine, the power from the main shaft 80 being communicated through the gears 106 and 105 to the roller 102.

In the reciprocal movements of the frame 35 the envelops are taken from the pack, moistened as described, and moved forward in direction of the stamp affixing mechanism, and transferred from one feeder to the other, one after the other in succession, it being observed that at each forward movement of the feed plate 60 the roller 56 receives a partial rotation, so that the absorbent material which extends around the greater portion of the roller is moistened with the water in the trough 53.

In the rotary movement imparted from the main power shaft 80 to the shaft 205, movement is communicated from the plate 210 to the connecting-rod 214 and the reciprocating bar 140 carrying the hooked catches 149 and 150.

The hooked catch 150 upon the inward movement of the reciprocating carriage 108, as seen in Fig. 1, is in position above and in engagement with the ratchet tooth upon the upper surface of the bar 128, and imparts an inward movement to the carriage frame 108, a measured distance approximating to the width of the stamp to be affixed to the envelop, which movement continues as fast as the envelops are fed through the machine. The reciprocating carriage 108 continues its movement inwardly until the last stamp in the row of stamps held by the feed rollers 154 and 158 has been affixed to the envelops, at which movement the outer end of the shaft 159 is struck by the inner end of the screw 156ˣ, extending through the end portion 109, of the reciprocating carriage, into the slotted tube 156, which movement moves the shaft 159 slidingly to the left a slight distance, and the spring plate 163 drops in the notch 161, in said shaft. This movement brings the clutch collar 202 and clutch pin 203 (which extends transversely to plate 197) in the direction of and close to the hub 193, on the inner side of the gear wheel 192. The clutch pin 203, on collar 202, now engages with the pin 195, and in the rotation of the gear wheel from the power transmitted from the gear wheel 191, on the shaft 138, partial rotation is communicated to said shaft 159, and thence by the key 160 to the slotted tube 156, carrying the stamp feed rollers 158, a distance equivalent to one-half the circle of rotation of said shaft and the stamp feeding rollers 155 and 156, on the reciprocating stamp carriage draw upon the stamps in the succeeding row of stamps, and feed the row of stamps to a position upon the upper surface of the plate 100, beneath the guide plate 173, and in a position for the action of the stamp-affixing plate 170, which is now actuated by the grooved cam 209, communicating power to the stamp-separating and affixing lever 168.

In the completion of the one-half rotation of the gear wheel 192, the projecting end of the clutch plate 194 comes into contact with the slotted plate 197, and the said clutch plate is moved within the slotted portion of the hub compressing the spring 185, and thereby releasing the clutch pins 195 and 200, and this action repeats itself at each end of the carriage movement. The position of the tripping plate 135 on the ratchet bars 128, during the time that the stamp carriage 108 is moving inwardly is reversed or in an upset position, as seen in full lines in Fig. 3, as left by the catch bar 150, when the dwell has been completed, and consequently the rod 137 pivoted thereto and actuating the plate extends rearwardly to its full extent. Upon the completion of the inward movement of the carriage 108, the rear end of said rod 137 comes into contact with the inner surface of the upward extension 16, of the left-hand side 15, of the frame of the machine, and moves said rod and the tripping plate forwardly into the dotted position shown, the inclined rear portion of the upper end of said tripping plate then being nearly in the same horizontal plane as that of the last ratchet tooth 131, on the bar 128, and at the same time the notched, forward portion of said upper end of plate 135 is positioned a slight distance in advance of a line passing transversely through the highest portion of the aforesaid ratchet tooth 131. The tripping plate 135 remains in said forward position until the carriage 108 reaches the limits of its outward movement.

Upon the completion of the inward movement of the carriage 108, as aforesaid, which has been through the engagement of the catch bar 150 with the ratchet bar 128, the catch bar 150 rides or moves upon the upwardly-inclined surface of the cam 130, on the outer end portion of the bar 128, in which movement of the catch bar the position of the combined catches is reversed in the manner described, the crank arms 151 being thrown to the right, changing the position of the spring 152 past the vertical line extending through the pivot of said catches 149 and 150. The catch bar 149 in this movement engages, as further described, with the ratchet teeth 133, on the ratchet bar 127, and in the reciprocal movements of the bar 140 carrying said catch bars, the outward movement of the carriage 108 follows step by step by the power applied through said reciprocations of said bar, the stamp being separated from the rows one after the other and affixed to the moistened envelop by the stamp separating and affixing lever 168, which acts to cut off the stamp upon the lines of the perforations of the sheet of stamps. This outward movement of the carriage 108 continues until it reaches the end of its outward movement, when the key 160, on the shaft 159, moving in the key-way 157, strikes the inner surface of the inner side 112, of the reciprocating stamp carriage 108, causing a sliding movement of the shaft 159 to the right, and the spring-plate 163 moves from the notch 161, in shaft 159, to notch or groove 162, thus bringing the collar 200 on the outer end of said shaft into position for the engagement of the clutch pin 201, with the clutch pin 195, on the clutch bar 194 adjacent thereto.

The combined action of the respective parts of the stamp feeding and stamp-affixing mechanism will now be noted step by step, as is followed in an operative detail movement of this operative machine, first observing that the ratchet teeth on the ratchet bars 127 and 128 referred to in the specification are all inclined, and the rectangular, upward projection with a horizontal surface at the left-hand end of the ratchet bars 128, as seen in Fig. 3, is a notched false tooth and performs no duty in the operation of the carriage 108.

In the completion of the outward movement of the reciprocating stamp carriage 108, as aforesaid, the catch bar 149, on the bar 140, comes into contact with and rides upon the inclined surface of the cam 132, and reverses its position, during which interval of time the circular plate 210, on the upper end of the shaft 205, is making the first quarter of a circle of rotation.

In the second quarter of the circle of rotation of the circular plate 210, the reciprocating bar 140 and the carriage 108 obtain a dwell on the outward dead center of the bar and plate and the grooved cam 205 is actuating the stamp separating and affixing lever 168, which lever now makes a complete downward and upward movement, cutting off from the row of stamps the last stamp in the row. In the next half circle of rotation of the plate 210 the clutch pin 201 on the clutch collar 200 being now in engagement with the pin 195, on the hub 193, of the clutch wheel 192, a half circle of rotation is imparted to the feed rollers 154 and 158, moving down another row of stamps into position and in the path of the stamp-separating and affixing plate 170. In the same half circle of rotation of the plate 210 the ratchet or catch bar 149 passes the first ratchet tooth in the series of ratchet teeth 133, on the bar 127, and slides over the inclined surface of the tripping plate 135 and rests upon the inclined surface of the second ratchet tooth. In the next revolution of the plate 210, and in the first quarter of the circle of rotation, the ratchet bar moves inwardly the pin 150ˣ on the outer surface of the catch bar 150 and engages with the notch 136, in the upper end of the tripping plate 135, raising the said tripping plate upwardly and rearwardly past the line of the first ratchet tooth and out of position, this being necessary to give time to the stamp-separating lever 168 to move down and separate the first stamp in the row of stamps in the said second quarter of the circle of rotation of the plate 210. In the next half circle of rotation of plate 210 the ratchet bar 149 is moved past the first ratchet tooth and rests upon the inclined surface of the second ratchet tooth and in the next rotative movement of plate 210, in the first quarter of the circle of rotation the catch bar 150 engages with the first ratchet tooth on the ratchet bar 128, pulling the carriage 108 inwardly the width of one stamp, and while the dwell is taking place in the second quarter of the circle of rotation of plate 210 the plate 170 separates the second stamp in the row of stamps, the catch bar in the next half circle of rotation of plate 210 riding up the inclined surface of the second ratchet tooth and nearer to the third ratchet tooth, and in the repeated rotative movement of the plate 210, as described, the carriage 108 moves inwardly, actuated by the feed bar 140, step by step, the lever 168 cutting off the stamps one after another in succession on the second quarter of the circle of rotation of plate 210.

When the catch bar 150 has engaged with the last ratchet tooth at the outer end of the bar 128, the rod 137 comes into contact with the inner side of the upward extension 16, of the main frame 15, moving forward the tripping plate 135 into position in advance of the first ratchet tooth. The shaft 159 is also struck by the screw 156$^x$, in the slotted tube 156, in the outer end of the carriage 108, thereby moving said rod slidingly to the left, and bringing the clutch pin 203, on the collar 202, in engagement with the pin 195, on the inner side of the clutch wheel 192, and at the same time on the second quarter of the circle of rotation of plate 210, the reciprocating bar 140 and the carriage 108 obtain a dwell, and the grooved cam 209 operates the stamp-operating lever 168, and the last stamp in the row is separated and affixed to the envelop. In the next half circle of rotation of the plate 210 the catch bar 150 moves on the inclined surface of the cam 130, and reverses its position, at the same time the clutch pin 195 on the clutch bar 194, on the hub of wheel 192, which is now in engagement with the clutch pin on the collar 202, on the end of shaft 159, is given one-half rotation, moving down one row of stamps and the clutch bar is disengaged as described, and at the same time the catch bar rides upon the inclined surfaces of the cam 130 and reverses its position, the catch bar 149 falling upon the portion of the ratchet bar beyond the first ratchet tooth. In the next quarter of the circle of rotation of the plate 210, which begins another circuit, the catch bar 149 moves inwardly upon the inclined surface of the second ratchet tooth. In the second quarter of a circle of rotation the dwell of the carriage and reciprocating bar 140, occurs during which time the cam 209 actuates the lever 168, and the first stamp in the row is separated and affixed to the envelop. In the next half circle of rotation the catch bar 149 engages with the first ratchet tooth on the bar 127 and moves the carriage one step outwardly the width of a stamp, it not being necessary for the catch bar to ride over the first tooth at the outward end of the carriage for the reason that the first stamp is separated from the row of stamps preceding the engagement of the catch bar 149 with the first ratchet tooth on the bar 127. The carriage then proceeds outwardly, repeating the operation described.

The various operations of the mechanism heretofore described are continued while the envelops are passing successively through the machine, until the last envelop has been stamped and ejected from the rollers 102 and 103, at which moment the pins 234, on the shaft 230, fall between the slats 19, of the bed or table, and the arm 232, comes into contact with the clutch bar 182, and the mechanism of the stamp affixing device ceases to operate.

While the stamp affixing and feeding mechanism are disconnected, the envelop feeding frame may be operated indefinitely, and when another pack of envelops is fed through the machine the shaft 230 is operated as before. Misuse of stamps is thus prevented, and also displacement after they are once arranged in the machine. If preferred, the moistening of the flaps can be dispensed with by closing valve 228 from the tank and draining the water through tube 64, or the roller turned so that the portion absorbing the water will not contact with the absorbent or plate 60.

In the reciprocating movement of the stamp feeding carriage and its relation to the envelop feeding and stamp affixing and envelop moistening mechanism a regulation is effected between the respective mechanisms, so that the timely movements will enable the operations to be completed under the rapid movements which may be given the main power shaft. This may be augmented by the power of a motor and the labor economized.

The invention enables the various kinds of envelops to be sealed, and the stamps to be affixed with a saving in time and labor, and with a uniformity in affixing stamps for uniform cancellation.

Various changes in form construction and operation may be made, and such modification and equivalents employed as are properly within the spirit of my invention.

Having fully described my invention, what I now claim as new and desire to secure by Letters Patent is.

1. In a stamp-affixing machine the combination with the frame of the machine and its bed or table, and envelop feeding devices movable over the surface of the table, of supports on the sides of said frame, a transverse plate positioned directly above the envelop-feeding devices connected with said supports, fingers on said transverse plate bearing on the surface of the bed or table, and a spring controlling the pressure of the fingers.

2. In a stamp-affixing machine for envelops, the combination with the main frame and the table or bed comprising longitudinal bars having spaces between, of a reciprocating frame, track rails upon the sides of said main frame, rollers upon and supporting said frame on the track rails, feed plates connected with the sides of said reciprocating frame, yielding fingers supported by the main frame bearing upon said longitudinal bars and adapted to control the movement of the feed plates.

3. In a stamp affixing machine the combination with the main supporting frame, and the longitudinal bars forming the bed of said machine having spaces between, track rails upon the sides of the main frame, a carrier frame having rollers mounted on the track rails, transverse envelop feeding plates connected with the sides of said frame, feed bars supported by said carrier frame and movable between said longitudinal bars, means for imparting a reciprocal movement to said carrier frame, and means for controlling the movement of the envelops in the reciprocal movements of said envelop feeding plates.

4. In a stamp-affixing machine, the combination with the main supporting frame, and track rails upon the sides of said frame, of longitudinal fixed bars composing the bed of the machine having spaces between, a carrier frame having side bars and transverse bars connected with the said side bars, rollers supporting said side bars upon said track rails, transverse, rearwardly-inclined feed plates for the envelops connected with said side bars on said carrier frame, and movable upon the surface of said longitudinal bars, composing the bed of the machine, movable bars connected with one of the transverse plates on the carrier frame and movable in the spaces between the bars composing the bed of the machine, inclined envelop feeding and ejecting blocks on the forward ends of the said movable bars, standards on the sides of the main frame of the machine, a transverse plate supported by said standards, and yielding fingers on said transverse plate adapted to bear upon the longitudinal bars forming the bed of the machine.

5. In a stamp affixing machine the combination with the stamp affixing mechanism, and means for feeding the matter to be stamped in the path of the stamp-affixing mechanism, of a carriage upon which the sheet of stamps is supported, means for moving the carriage reciprocally past the stamp-affixing mechanism at intervals in the path of the carriage movement, rotatable stamp-feeding devices on said carriage and clutch mechanism attached automatically by the carriage at each end of the carriage movement for clutching the feeding devices on the stamp carriage and imparting partial rotation thereto, and moving into position a row of stamps upon the sheet successively in the path of the stamp-affixing mechanism.

6. In a machine for affixing stamps to envelops, the combination with the main power shaft, of power-transmitting mechanism and mechanism actuated thereby for affixing the stamps to the envelops, means for feeding the matter to be stamped to the stamp-affixing mechanism, a reciprocating stamp-supporting carriage, means actuated by the power-transmitting mechanism for moving the carriage step by step in its path of movement past the stamp-affixing mechanism, a rotatable shaft on said carriage, and stamp feeders actuated by said shaft, and rotary clutch mechanism actuated by the power-transmitting mechanism acting to clutch said shaft at the completion or at each end of the carriage movement and impart a partial rotation to said shaft and move a row of the sheet of stamps into position for the affixing of the stamps to the envelops.

7. In a machine for affixing stamps to envelops, the combination with the main power shaft, of power-transmitting mechanism, and mechanism actuated thereby for affixing the stamps to the envelops, a reciprocating stamp-supporting carriage adapted to move the stamps in succession and at regular intervals past the stamp-affixing mechanism, means actuated by the power-transmitting mechanism for moving the carriage step by step reciprocally in its path of movement past the stamp affixing mechanism, means for feeding the matter to be stamped to the stamp-affixing mechanism, rotary stamp feeders on said reciprocating carriage, and clutch mechanism actuated automatically by the reciprocating carriage at each end of the carriage movement for imparting a partial rotation to the stamp feeders and moving a row of stamps in a sheet of stamps into position to be affixed to the envelops.

8. In a machine for affixing stamps to envelops, the combination with the main power shaft, of power-transmitting mechanism and mechanism actuated thereby for affixing the stamps to the envelops, means for feeding the matter to be stamped to the stamp-affixing mechanism, a reciprocating stamp-supporting carriage, means actuated by the power-transmitting mechanism for moving the said carriage step by step in its path of movement past the stamp-affixing mechanism, a longitudinally-slotted rotatable tube on said carriage, and stamp feeders on said tube, a rotatable, slidable shaft within said tube, rotary clutch mechanism adapted to clutch said shaft at each end of the carriage movement and impart a partial rotation thereto, and a key on said shaft adapted to be struck at each end of the carriage movement and move said shaft into engagement with the clutch mechanism.

9. In a machine for affixing stamps to envelops, the combination with the main power shaft of power-transmitting mechanism and mechanism actuated thereby for affixing the stamps to the envelops, means for feeding the matter to be stamped to the stamp-affixing mechanism, a reciprocating stamp-supporting carriage, means actuated by the power-transmitting mechanism for moving the said carriage step by step past the stamp-affixing mechanism and reciprocally in its path of movement, a rotatable, slidable shaft supported by said carriage, stamp feeders actuated by and in the rotation of said shaft, clutches actuated by the power-transmitting machanism engaging alternately with said shaft and imparting a partial rotation thereto, and means struck by the carriage imparting a sliding movement and moving said shaft into engagement with the said clutches alternately.

10. In a machine for affixing stamps to envelops the combination with the stamp-affixing mechanism of means for supporting and feeding the stamps in succession to the stamp-affixing mechanism comprising a carriage movable at regular intervals past the stamp-affixing mechanism, a holder for the sheet of stamps on said carriage, and feeders for the stamps comprising upper and lower feed rollers, a longitudinally slotted, rotatable tube supporting the upper feed roller, and a shaft having one end extending within said tube, a key on said shaft which is struck by the carriage at each end of the carriage movement, and means acting simultaneously to impart a partial rotation to said shaft.

11. In a stamp-affixing machine the combination with the frame of the machine and the stamp affixing-mechanism, of means for holding a sheet of stamps in a movement at regular intervals past the stamp-affixing mechanism comprising a carriage mounted on said frame, means for imparting to the carriage a reciprocating movement step by step past the stamp-affixing mechanism, means for feeding the matter to be stamped to the stamp-affixing mechanism, a longitudinally slotted, rotatable tube on said carriage, feed rollers on said tube, and a separate feed roller on said carriage beneath said tube, a rotatable, slidable shaft having one end extending within said tube, and a key on said shaft which is struck by the carriage at each end of the carriage movement, rotary clutches on the frame of the machine acting alternately to clutch said shaft in the sliding movement imparted by the said key and advance a row of stamps from the sheet of stamps to the stamp-affixing mechanism, and means engaging releasably with the said sliding shaft when said shaft is grasped alternately by said clutches.

12. A mechanism for stamp-affixing machines comprising a power-actuated reciprocating bar, and suspensory devices thereon, oppositely extended, hooked catches, a centrally located pivot therefor on the suspensory devices, a reciprocating stamp holder, and ratchet bars on said holder, and ratchet teeth upon the respective bars spaced apart and oppositely-inclined and adapted to be engaged alternately by the said hooked catches, an arm connected with the pivot on the said hooked catches, and a spring-connected with said arm and the suspensory devices for said hooked catches directly above said pivot.

13. In stamp-affixing machines the combination with the main frame of a reciprocating carriage frame mounted thereon, sliding supports therefor on said main frame, a stamp holder and feeder upon said carriage frame, ratchet bars connected with said carriage frame, and ratchet teeth upon the respective bars spaced apart and inclined in opposite directions, a power-actuated reciprocating bar, and suitable supports therefor on the main frame, suspensory devices on said bar, spring-actuated hooked catch-bars adapted to engage with the respective ratchet teeth alternately and connected together and pivoted to said suspensory devices, and a spring-actuated pivoted crank arm for controlling the engagement of the hooked catches yieldingly with the ratchet teeth on the ratchet bars in opposite engaging positions.

14. In a stamp-affixing machine, the combination with a reciprocating carriage frame, and bars upon said frame, of a reciprocating power-imparting bar, oppositely extended hooked catches carried by said latter bar connected together and extending in opposite directions, devices on said carriage frame with which said hooked catches engage, suspensory devices for said hooked catches, and a pivot upon the suspension devices for said catches, an arm connected with said pivot, and a coiled spring connected with said suspensory devices and said arms and adapted to control the movement of the catch bars in opposite engaging position yieldingly, and cams on the bars on the carriage frame adapted to shift the said hooked catches in position.

15. A mechanism for stamp feeders in stamp-affixing machines comprising a main frame, and a reciprocating carriage on said frame, a rotary shaft, a bracket and its support on the said main frame in which the said rotary shaft is mounted to slide freely, a power-actuated wheel loosely mounted on said shaft, hubs on said wheel, spring-controlled clutch bars having outwardly-extended ends on said hub, and clutch pins on the inner ends of the clutch bars, collars fixed to said shaft, and clutch pins on said collars adapted to come into engagement with the clutch pins on the clutch bars alternately, and stationary plates on said bracket in the path of the extended ends of the said clutch bars.

16. In a stamp-affixing machine the combination with the main frame and the stamp affixing devices on said frame, and means for feeding the matter to be stamped to said devices, a reciprocating stamp-carrying frame, a rotatable sliding shaft, a rotary stamp-feeding tube on said carriage frame having a longitudinal slot within which tube one end of said rotary shaft extends, a key on said shaft adapted to be struck by the carriage at each end of the carriage movement, a bracket on the main frame supporting the other end of said rotary shaft, and a power wheel loosely mounted on said shaft, hubs on said wheel, and spring-controlled clutch bars on said hubs having outwardly extended ends, clutch pins on the inner ends of said bars, collars connected with said shaft, clutch pins on collars movable with the shaft alternately to and from engagement with the clutch pins on said clutch bars, and a slotted plate connected with the said bracket with which the extended ends of the clutch bars are adapted to come into contact and disengage the clutch pins on the inner ends of the said bars, in the completion of a partial rotation of said rotary shaft.

17. In a stamp-affixing machine the combination with the main frame and the stamp-affixing devices, and means for feeding the matter to be stamped to said devices, a reciprocating carriage frame supporting a sheet of stamps, and means for feeding the stamps to the stamp-affixing devices, sliding supports for said carriage on the main frame, ratchet bars on the carriage frame, and ratchet teeth on the respective bars inclined oppositely to each other, a power-actuated, reciprocating bar on the main frame, means on the main frame for imparting reciprocation to said bar, and suspensory devices on said bar, oppositely extended, hooked catch bars connected together and pivoted to said suspensory devices, a pin on one of said catch bars, means for holding the catch bars yieldingly and alternately in engagement with the ratchet teeth on the respective ratchet bars, and a rearwardly retractable pivoted support for the ratchet bar with which the pin on said catch bars comes into contact and obtains a dwell upon the movement inwardly of the reciprocating carriage, and means contacting with the side portion of the main frame for moving said support forwardly in the completion of the inward movement of said carriage frame.

18. In a stamp-affixing machine the combination with the main frame and the upward side extensions thereof, the stamp affixing devices, and means for feeding the matter to be stamped to said devices, of a reciprocating carriage frame for supporting the sheet of stamps in a movement past the stamp-affixing devices, sliding supports for the carriage frame on the main frame, ratchet bars on the said carriage frame, and ratchet teeth on the respective bars inclined oppositely to each other, a power-actuated reciprocating bar, and suspensory devices thereon, oppositely extended hooked catch bars connected together and pivoted to said suspensory devices, a pin on the side of one of said catch bars, means for holding the catch bars yieldingly and alternately in engagement with the ratchet teeth on the respective ratchet bars, a plate having a notch pivotally connected with one of said ratchet bars and in the path of the pin on said catch bars and adapted to be moved from a normal upright position rearwardly and obtain a dwell in the inward movement of the stamp carriage of one of the ratchet bars prior to engagement with the first ratchet tooth, and means connected with said notched plate, adapted to contact with the upward side extension of the main frame, in completing the inward movement of the carriage returning the said plate to its normal position.

19. In a stamp-affixing machine the combination with the main frame having upward side extensions, and the stamp affixing devices, and means for feeding the matter to be stamped to said devices, of a reciprocating carriage frame for supporting the sheet of stamps in a movement past the stamp-affixing devices, sliding supports for the carriage frame on the stamp carriage frame, ratchet bars on said main frame, and ratchet teeth on the respective bars inclined oppositely to each other, a power-actuated reciprocating bar, and suspensory devices thereon, oppositely-extended hooked catch bars connected together and pivoted to said suspensory devices, a pin on the side of one of said catch bars, means for holding the catch bars yieldingly and alternately in engagement with the ratchet teeth on the respective ratchet bars, a plate having a notch pivotally connected with one of said ratchet bars, and in the path of the pin on said catch bars, and adapted to be moved from a normal upright position rearwardly in the dwell of one of said ratchet bars prior to engagement with the first ratchet tooth, and a sliding rod supported by said reciprocating carriage, pivotally connected at its outer end with the said pivoted notched plate and adapted to come into contact at its inner end with the upwardly-extended portion of the side of said main frame.

20. In a stamp-affixing machine the combination with the main frame, the main power shaft, and the stamp-affixing mechanism, of longitudinal bars having spaces between forming the bed of the machine, power-transmitting mechanism actuated by the main power-shaft, a power transmitting wheel loosely mounted on said shaft, a hub on said wheel, and a spring-actuated clutch engaging said hub, a rock shaft journaled on the main frame, and pins on said shaft adapted to extend in the spaces between said longitudinal bars forming said bed, means for feeding the envelops in succession over the bed of said machine to the stamp-affixing mechanism, and an arm on said shaft carrying said pins adapted to come into contact with the clutch bar, and a suitable bearing for said arm on said main frame.

21. In a stamp-affixing machine the combination with the main frame and the main power shaft and the stamp-affixing mechanism, and with the power-transmitting mechanism from the main power shaft to the stamp-affixing mechanism of longitudinal bars forming the bed of the machine having spaces between, a power-transmitting wheel loosely mounted on the said main shaft, a hub on said wheel, means for feeding the matter to be stamped to the stamp-affixing mechanism, and a clutch on said shaft adapted to clutch the hub on said power-transmitting wheel, a rock-shaft journaled on the main frame, a bent arm on said shaft adapted to actuate said clutch, and pins in said rock shaft in the path of the matter to be stamped, and a suitable bearing for said bent arm on the main frame.

22. In a stamp-affixing machine, the combination with the main frame and the main power shaft and the stamp-affixing mechanism, of longitudinal bars having spaces between forming the bed of the machine, power-transmitting mechanism actuated by the main power shaft, a power-transmitting wheel loosely mounted on said shaft, a hub on said wheel and a pin on said hub, a fixed wheel on said shaft adjacent to said loosely-mounted wheel, and a spring-actuated clutch bar on said wheel having an outer, extended end-portion, and a pin on the inner end of said clutch bar adapted to engage with the pin on the hub of the said loosely-mounted wheel, a rock shaft mounted on the main frame of the machine and a bent arm on said shaft adapted to come into contact with the extended end of said clutch bar, a bearing on the frame of the machine for said arm, means for feeding the matter to be stamped over the bed of said machine to the stamp-affixing devices, and pins on said rock shaft adapted to extend within the spaces between the said longitudinal-bars of the bed of the machine and to be raised in position by the matter to be stamped in its passage to the stamp-affixing devices.

23. In a stamp-affixing machine, the combination with the main frame and the main power shaft, and with the stamp-affixing mechanism and the reciprocating stamp carriage supporting the sheet of stamps, of a reciprocating carriage on the bed of said machine actuated by the main power shaft, and feeders on said carriage for feeding the matter to be stamped to the stamp-affixing mechanism, power-transmitting mechanism on the main frame, transmitting power to the stamp-affixing mechanism and the reciprocating stamp carriage supporting the sheet of stamps, means on the said carriage for feeding a row of stamps from the sheet of stamps to the stamp-affixing mechanism at each end of the carriage movement, a loosely-connected power-transmitting wheel in the main power shaft, and clutch mechanism on said shaft for clutching said wheel, and clutch-controlling means co-acting with the clutch and the matter to be stamped in its passage to the stamp-affixing mechanism.

24. In a stamp-affixing machine, the combination with the main frame, the main power shaft, and the stamp-affixing mechanism, and with the feeding devices for the envelops actuated by the main power shaft, of a lever pivotally connected with the main frame, a frame positioned above the envelops in passing through the machine, and moistening means for the envelops within said frame, a bar connected with the said frame and one end of said lever, and a cam on the main power shaft actuating the other end of said lever.

25. In a stamp-affixing machine, the combination with the main frame and the main power shaft, and with the sides of said frame having upwardly-extended portions, of a bracket upon the side of said machine, and one of said upwardly-extended portions, a stamp-affixing lever pivotally connected with the forward end of the machine, a vertical shaft on said bracket actuated by the main power shaft, and a grooved cam on said shaft actuating the said stamp-affixing lever.

26. In a stamp-affixing machine, the combination with the main frame and the main power shaft, and with the sides of said frame having upwardly-extended portions, of a bracket on the side of said machine and one of said upwardly-extended portions, a reciprocating carriage on the main frame, and sliding supports therefor in the sides of the main frame, and a stamp-affixing lever pivotally connected with the forward end of said machine, a vertically positioned rotary shaft mounted in said bracket and actuated by the main power shaft, a grooved cam on said shaft actuating the stamp-affixing lever, a reciprocating bar, and supports therefor upon the forward end of said main frame, oppositely extended hooked catches carried by said bar, and ratchet bars having ratchet teeth on said carriage co-acting to impart a reciprocating movement to the carriage, and a crank wheel on said vertical shaft carrying said grooved cams, and a connecting bar connected with the crank wheel and also with the said reciprocating bar.

27. In a machine for affixing adhesive stamps to envelops, the combination with the bed of the machine comprising slats or bars and with a vertically reciprocating stamp affixing device, of a transverse plate supporting the forward ends of said bars, and a depressed portion of said plate beneath the forward end of one of said bars, and the said stamp affixing device and a spring supporting said bar within said depressed portion of the plate.

28. In a machine for affixing adhesive stamps to envelops, the combination with the main frame having a discharge opening in the forward end for the envelops, and with the bed of said machine comprising slats or bars, of a transverse plate supporting the forward ends of said bars, a depressed portion of said plate beneath the forward end of one of said bars, and a yielding support on said depressed portion of the plate for said end of the bar, a plate connected with the forward end of the main frame having an opening of the size of a stamp and above said end of the bar having the yielding support, and stamp affixing devices movable within said opening.

29. In a machine for affixing stamps to envelops, the combination with the main frame, and the main power shaft, of track bars on the sides of said main frame, a reciprocating frame, and envelop feeders on said frame, a power-transmitting shaft beneath said frame, bevel gearing connecting the forward end of said shaft with the main power shaft, a vertical crank shaft, and a connecting bar connected with the crank on said shaft, and the forward portion of said reciprocating frame, and bevel gearing connecting the rear end of said power-transmitting shaft with the crank shaft.

FREDERICK R. S. DITMARS.

Witnesses:
HARRY L. GREEN,
FRANCIS A. LEACH.